(No Model.) 2 Sheets—Sheet 1.

J. COLGROVE.
SEED POTATO CUTTER.

No. 505,095. Patented Sept. 19, 1893.

Witnesses:
Harry L. Amer.
W. S. Duvall.

Inventor:
James Colgrove.
by C. A. Snow & Co.
Attorneys.

(No Model.) 2 Sheets—Sheet 2.
J. COLGROVE.
SEED POTATO CUTTER.
No. 505,095. Patented Sept. 19, 1893.
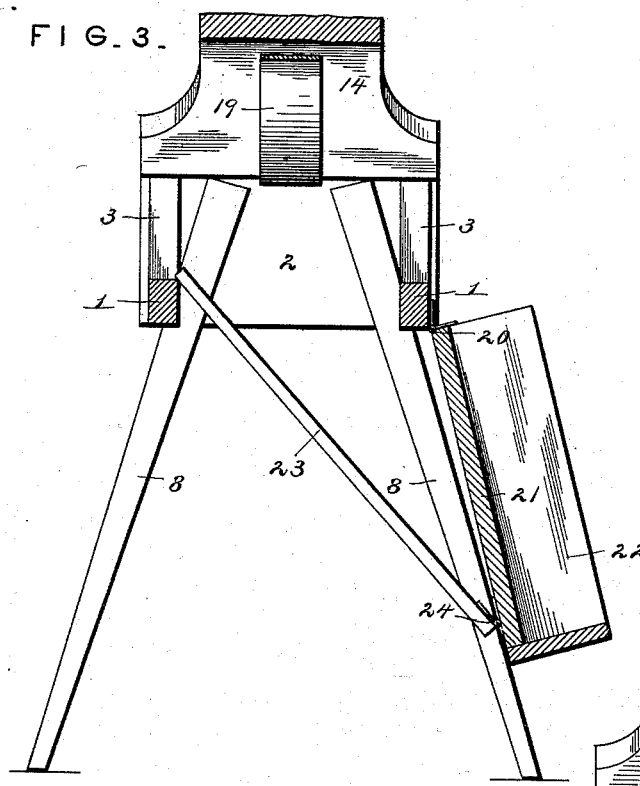
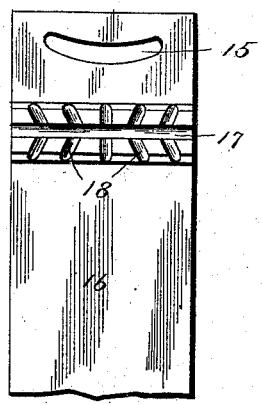
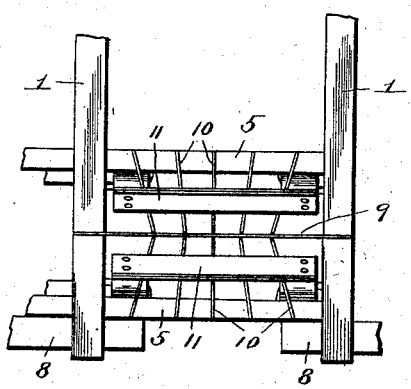
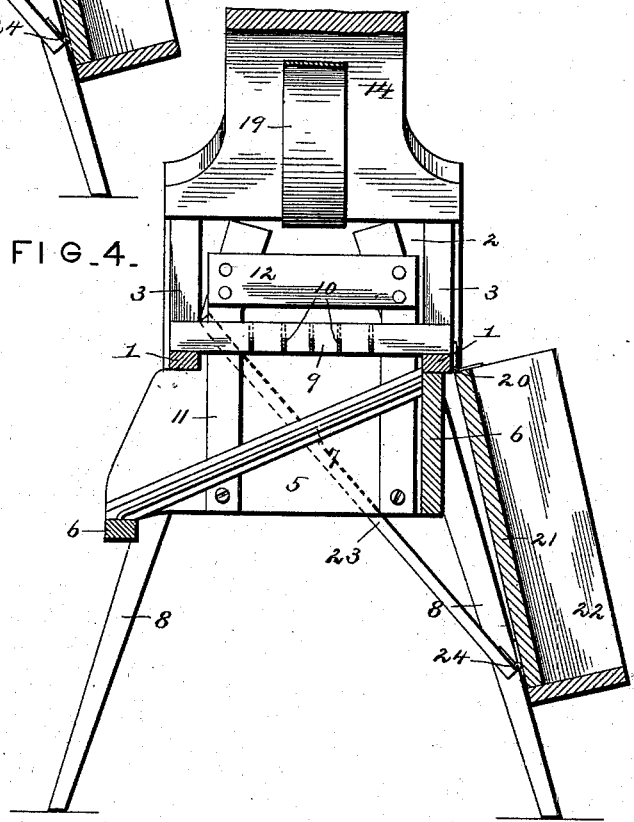
Witnesses:
Harry L. Amer.
W. S. Duvall.
Inventor:
James Colgrove.
by C. H. Snow & Co.
Attorneys.

UNITED STATES PATENT OFFICE.

JAMES COLGROVE, OF CLEAR WATER, MINNESOTA.

SEED-POTATO CUTTER.

SPECIFICATION forming part of Letters Patent No. 505,095, dated September 19, 1893.

Application filed May 8, 1893. Serial No. 473,465. (No model.)

*To all whom it may concern:*

Be it known that I, JAMES COLGROVE, a citizen of the United States, residing at Clear Water, in the county of Wright and State of Minnesota, have invented a new and useful Seed-Potato Cutter, of which the following is a specification.

My invention relates to that class of machines intended for cutting seed potatoes; the objects in view being to provide a machine of this class which can be readily operated by hand and is adapted to effectually and rapidly slice or cut potatoes for seed purposes; to so construct the machine as to avoid danger of injuring the hand of the operator employed to feed the potatoes to the machine, or in other words to provide means for holding the potatoes during the descent of the plunger; and, furthermore, to so arrange the cutters as to obviate the liability of them becoming stuck between the cutting blades.

Other objects and advantages of my invention will appear in the following description, and the novel features thereof will be particularly pointed out in the claims.

Figure 1:
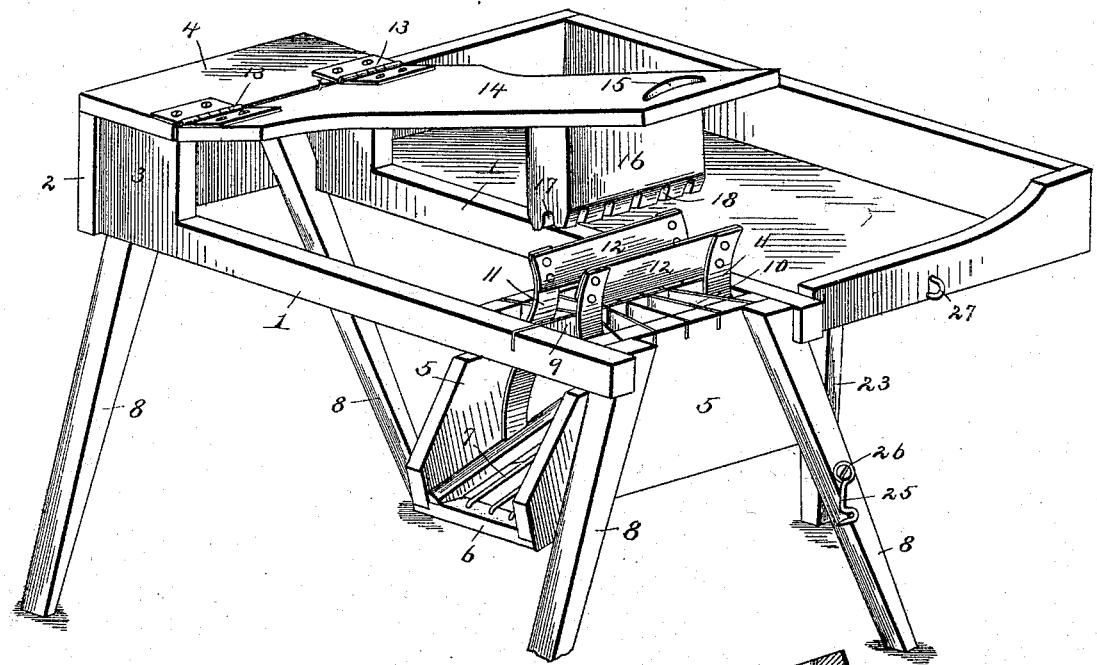
Figure 2:
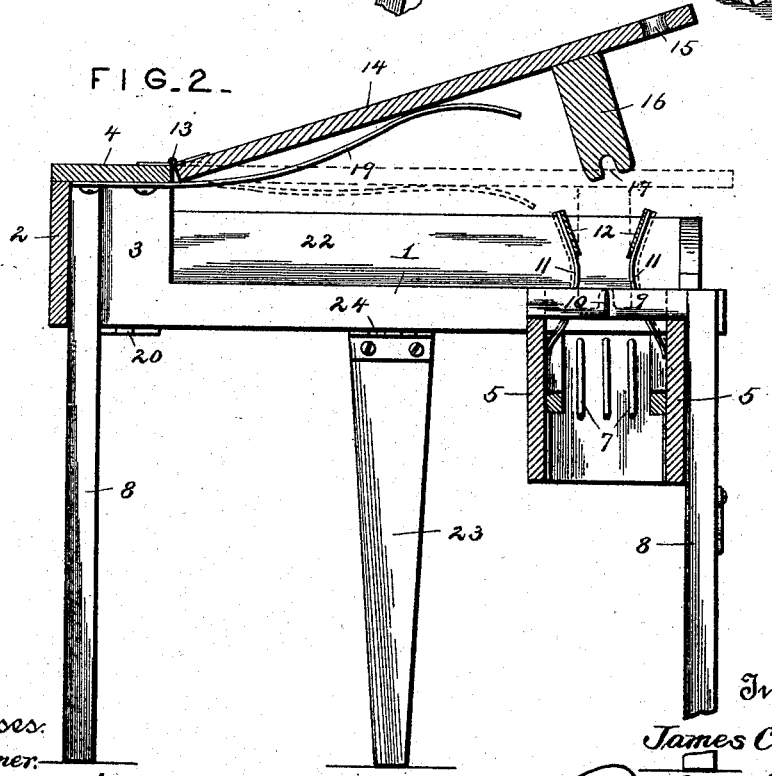

Referring to the drawings:—Figure 1 is a perspective view of a machine constructed in accordance with my invention. Fig. 2 is a longitudinal sectional view. Fig. 3 is a transverse sectional view, the tray being shown as folded. Fig. 4 is a similar sectional view through the cutters. Fig. 5 is an inverted plan of the plunger. Fig. 6 is a plan of the cutters.

Like numerals of reference indicate like parts in all the figures of the drawings.

In constructing the frame of the machine I employ a pair of opposite side-bars 1, connecting the same at the rear ends by a cross-bar 2, whose upper edge is flush with the rear raised portions of the side-bars, which raised portions form standards 3, and have superimposed thereover a cross piece 4. The side-bars have interposed at their front ends the opposite transversely disposed side-walls 5 of a box, which are connected at their opposite ends by cross pieces 6. These cross pieces are in turn connected by a series of inclined wires or bars 7, the same constituting an inclined way down which the cut potatoes travel and through which any débris or residue may pass. The frame as thus constructed is supported by a series of, in this instance, four legs 8, which diverge toward their lower ends to form a stable support or base. The sides 5 of the box are cut away so that their upper edges are flush with the upper sides of the bars 1, and combine therewith to form a rectangular cutter-frame, which is subdivided longitudinally by a central knife blade 9, at intervals provided upon its under side or butt-edge with vertical slots arranged equidistant. The upper edges of the sides 5 are provided with slots of an equal number, those at each side of the center being wider apart than are the slots in the blade, this distance apart increasing as the outer end of the series is approached, so that by inserting into the slots of the knife and those of the knife-frame, a series of transverse blades 10, the said blades will be farther apart at their outer ends than they are at their centers. In this manner the potatoes which are sliced by being forced through the openings between the blades are not so liable to become stuck in position, or in other words, will more readily fall through upon the inclined way heretofore described, and immediately above which the cutter-frame is located. Pairs of spring-arms 11 are secured to each of the sides 5 of the box and extend up and through the knife-frame at each side of the longitudinal blade 9, and to each of the spring-arms is secured a transverse plate 12, which by reason of the curvature of the springs converge at their lower edges. These plates constitute a holder for the potatoes and support the same directly over the cutters whereby such support by hand may be avoided.

Hinged to the cross-piece 4, as indicated at 13, is a vibratory lever 14, which extends to the front end of the machine, and in the present instance is provided with a hand-hold 15. To the under side of the lever there is secured a plunger-head 16, which is provided with a longitudinal groove 17 into which the longitudinal knife takes, and with a series of transverse or intersecting grooves 18 into which the transverse knives 10 take when the said plunger descends. The front and rear sides of the plunger are slightly beveled, so that as the plunger descends it passes between the yielding potato-holding plates and spreads them. The plunger is normally elevated by means of a curved flat spring 19, which extends from the cross piece 4 and at its front free end takes under the lever 14.

Hinged to one end of the side-bars 1, as indicated at 20, is a drop-leaf 21 having its front, rear, and outer edges provided with a surrounding flange 22. A supporting leg 23 is hinged, as at 24, to the under side and near the free edge of the drop-leaf, and may be employed to support the drop-leaf in a horizontal position, or when the leaf is dropped may extend up between the bars 1, and thus be out of the way and add to the compactness of the machine as a whole. A hook 25 is pivoted as at 26 to that leg of the machine adjacent to the drop-leaf, and at its free end is designed to engage with an eye 27 that projects from the corresponding end of said drop-leaf, whereby the drop-leaf is maintained in position, and the machine may more readily be transported.

In operation, the operator sits in front of the machine with his left hand engaging the hand-hold 15 of the lever and his right hand employed in successively feeding the potatoes from the tray or drop-leaf to the potato-holding plates heretofore mentioned. As each potato is placed in position, the lever through the medium of the left hand of the operator, is drawn down against the tension of the spring and the plunger forces the potato against the knives, thus slicing the same and pushing the slices down through the openings between the knives to the inclined way or chute, from which they may be collected in a basket or other receptacle placed thereunder. After each depression of the plunger and lever the spring will upon the release of the same from the pressure of the hand re-elevate said plunger and lever.

Various changes in the details of construction of my invention will readily suggest themselves to those skilled in the art to which it appertains, and I therefore do not limit the invention to such exact details as I have herein shown and described, but hold that I may vary the same to any degree and extent within the knowledge of the skilled mechanic.

Having described my invention, what I claim is—

1. In a machine of the class described, the combination with a rectangular frame having a raised portion at its rear end, a lever hinged to the raised portion and extending forwardly over the frame, a spring for elevating the lever, and a plunger arranged upon the under side of the lever and provided with intersecting grooves, of a knife-frame having intersecting knives arranged in the path of the plunger, and a pair of converging yieldingly supported potato-clamping plates arranged over the knife-frame, substantially as specified.

2. In a machine of the class described, the combination with a rectangular frame having a raised portion at its rear end, a lever hinged to the raised portion and extending forwardly over the frame, a spring for elevating the lever, and a plunger arranged upon the under side of the lever and provided with intersecting grooves, of a knife-frame having intersecting knives arranged in the path of the plunger, a pair of yieldingly supported converging potato-clamping plates arranged and horizontally supported over the knife-frame, said plunger having its opposite edges beveled to spread the plates, substantially as specified.

3. In a machine of the class described, the combination with the opposite side bars, a superimposed plunger, and supporting legs for the bars, of the sides 5 of the box cut away at their ends and located between the side bars with which they combine to form a knife-frame, inclined rods forming a chute arranged in the side-bars, a longitudinal knife let into the side-bars and subdividing the frame, and a series of transverse knives let into the longitudinal knife and having their ends let into slots in the sides 5 and at increasing distances apart, substantially as specified.

4. In a machine of the class described, the combination with the open frame, the knife-carrying frame arranged therein, and a superimposed plunger, of the hinged drop-leaf secured to one of the side-bars of the frame, and the hinged leg secured to the under side of the drop-leaf and adapted at its free end when the drop-leaf is closed to take between the side-bars of the frame, substantially as specified.

5. In a machine of the class described, the combination with the main frame, the knife-carrying frame, the sides 5 extending below the same and forming a box, the rods arranged in the box and forming an inclined way, of the superimposed plunger, opposite pairs of bent spring-arms extending through the knife-frame and secured to the sides 5, and converging plates secured to the spring-arms, substantially as specified.

6. In combination with the box provided with the knife frame having the longitudinal and transverse series of knives, the spring arms 11 secured to the box and extending up above the knife frame, the plates 12 secured to the arms, the said arms and plates constituting a holder for the potatoes, and the plunger, substantially as specified.

7. In combination with the box, the knife frame at the top thereof having the series of knives, the spring holder for the potatoes to support the latter directly over the knife frame, and the spring supported plunger adapted to work down between the sides of the spring holders, for the purpose set forth.

8. The framework having the box 5, at one end provided with an open bottom, and the inclined rods 7 crossing the bottom of the box and forming an inclined perforated way, the knife frame at the top of the box, and the plunger, substantially as described.

9. The box 5, provided with a longitudinal knife blade 9, having at intervals upon its under side a series of vertical slots, the sides of the box being also provided with a series of slots, which are wider apart than the slots of the knife, and a series of transverse blades 10 inserted at their ends in the slots of the box and also engaging with the slots of the blade 9, whereby the blades 10 are arranged farther apart at their outer ends than at their centers, substantially as described.

In testimony that I claim the foregoing as my own I have hereto affixed my signature in the presence of two witnesses.

JAMES COLGROVE.

Witnesses:
P. D. STORMS,
L. H. AIKINS.